United States Patent [19]

Keenan et al.

[11] Patent Number: 4,589,294

[45] Date of Patent: May 20, 1986

[54] VEHICLE TRANSMISSION WITH A PLURALITY OF FORWARD AND REVERSE SPEEDS

[76] Inventors: Thomas F. Keenan, 4847 Embassy Ct.; John J. Kass, 1320 Oeth Ct., both of Dubuque, Iowa 52001

[21] Appl. No.: 632,913

[22] Filed: Jul. 20, 1984

Related U.S. Application Data

[62] Division of Ser. No. 444,922, Nov. 26, 1982, Pat. No. 4,523,655.

[51] Int. Cl.$^4$ ............................................. F16H 3/08
[52] U.S. Cl. ........................................ 74/331; 74/356; 74/357; 74/359; 74/360
[58] Field of Search .................. 74/331, 359, 333, 325, 74/356, 357, 360

[56] References Cited

U.S. PATENT DOCUMENTS

| | | | |
|---|---|---|---|
| 2,647,596 | 8/1953 | Cook | 74/333 X |
| 2,825,232 | 3/1958 | Sieving et al. | 74/331 |
| 2,953,942 | 9/1960 | Schwartz et al. | 74/360 X |
| 2,971,398 | 2/1961 | Sieving | 74/745 X |
| 3,318,167 | 5/1967 | Frost | 74/331 |
| 3,425,293 | 2/1969 | Krawczyk et al. | 74/360 |
| 3,871,462 | 3/1975 | Krolak et al. | 180/70.1 X |
| 4,063,464 | 12/1977 | Crabb | 74/331 |
| 4,145,935 | 3/1979 | Herlitzek | 74/331 |
| 4,276,952 | 7/1981 | Kuhfuss, Jr. et al. | 180/70.1 X |
| 4,333,358 | 6/1982 | Grattapaglia | 74/359 |

FOREIGN PATENT DOCUMENTS

| | | | |
|---|---|---|---|
| 203026 | 12/1955 | Australia | 74/360 |
| 763193 | 7/1967 | Canada | 74/359 |

*Primary Examiner*—Leslie A. Braun
*Assistant Examiner*—Dwight G. Diehl

[57] ABSTRACT

A vehicle transmission characterized by having a low profile, and a plurality of forward and reverse speeds. The transmission includes a plurality of shafts inclusive of an input shaft, an output shaft, a counter shaft and a plurality of gear shafts. The shafts are rotatably mounted in the transmission casing in a generally triangular transverse cross-sectional configuration. These are in selective gear communication. Selective gear communication is provided in part by hydraulic fluid responsive clutches selectively ported through the casing from a casing manifold.

1 Claim, 5 Drawing Figures

VEHICLE TRANSMISSION WITH A PLURALITY OF FORWARD AND REVERSE SPEEDS

This is a division of application Ser. No. 444,922, filed Nov. 26, 1982, now U.S. Pat. No. 4,523,655.

BACKGROUND OF THE INVENTION

This invention relates to mounting arrangements for mounting a component on a vehicle and more particularly to the mounting of a transmission in an off-road vehicle frame.

Off-road vehicles located at a remote job site may require transmission servicing. Because of the generally modular construction of the transmissions, servicing will often require removal of the transmission from the vehicle. Although the transmission package may be readily detached from the vehicle frame, drive shaft, and axles, it has proven difficult to remove the transmission from the vehicle due in part to interference with adjacent components of the vehicle.

To improve the transmission serviceability characteristic, it is known to mount the transmission rearward on a vehicle frame as illustrated in U.S. Pat. Nos. 2,971,398, 3,871,462, and 4,276,952. The illustrated mounting arrangements can exhibit alignment difficulties, especially when a hydraulic power shift transmission is employed.

SUMMARY OF THE INVENTION

It is an objective of the present invention to present a vehicle frame transmission mounting arrangement providing improved serviceability characteristics. It is a further objective of the present invention to present a mounting arrangement particularly suited for employment with a power shift transmission.

The vehicle main frame has a forward and rear section. The rearward section is comprised of a housing having a detachable rearwardmost wall. The housing further contains a plurality of transversely aligned sections separated by interior walls wherein the second or middle section houses a transmission. The transmission is supported forwardly on a plurality of cantilever mounted longitudinal extending rods and is rearwardly detachably mounted to a plurality of mounting walls. The transmission can be detached from the mounting wall and slidably removed from the rear housing along the mounting rods.

A particularly suited hydraulic transmission herein referred to as a low profile transmission includes an output shaft extending forward from the transmission parallel to a forwardly received input shaft. The output shaft communicates with a bevel drive system mounted forward on the transmission casing. Steering shafts extend into the bevel drive, one end of each steering shaft respectively communicates with a steering clutch assembly and final drive. The transmission includes a plurality of hydraulic fluid receiving ports. The mounting wall contains a manifold having a plurality of hydraulic fluid ports. A plurality of tubular members communicate a respective one of the ports in the manifold to a port in the transmission wall.

Other objectives and benefits of the present invention will be developed in the Detailed Description of the Preferred Embodiment.

DETAILED DESCRIPTION OF THE PREFERRED EMBODIMENT

Figure 1:
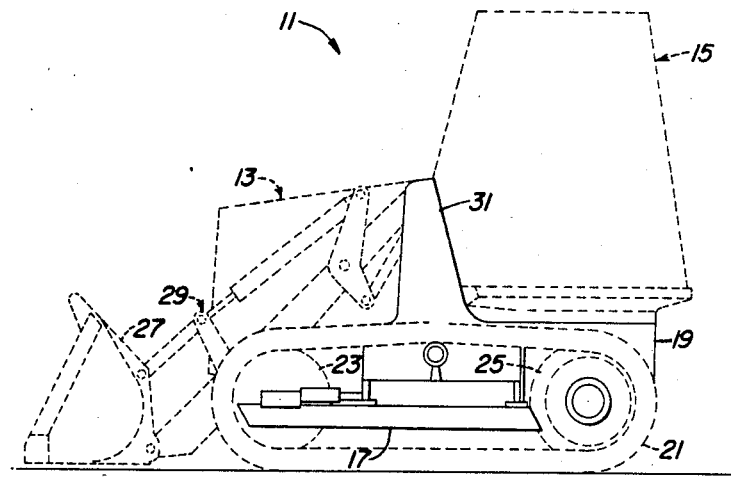
FIG. 1 is a side elevational view of a crawler-loader partially in phantom.

Referring to FIG. 1, a crawler-loader, generally indicated as 11, has an engine compartment 13 followed by an operator station 15 (shown in phantom) mounted on a frame having a forward section 17 and rear section 19. The vehicle is supported on endless tracks 21 carried by a respective forward idler wheel 23 and a rear drive sprocket 25. The vehicle 11 has a bucket 27 attached to a lift assembly 29 mounted to a tower 31 on the forward frame.

Figure 2:
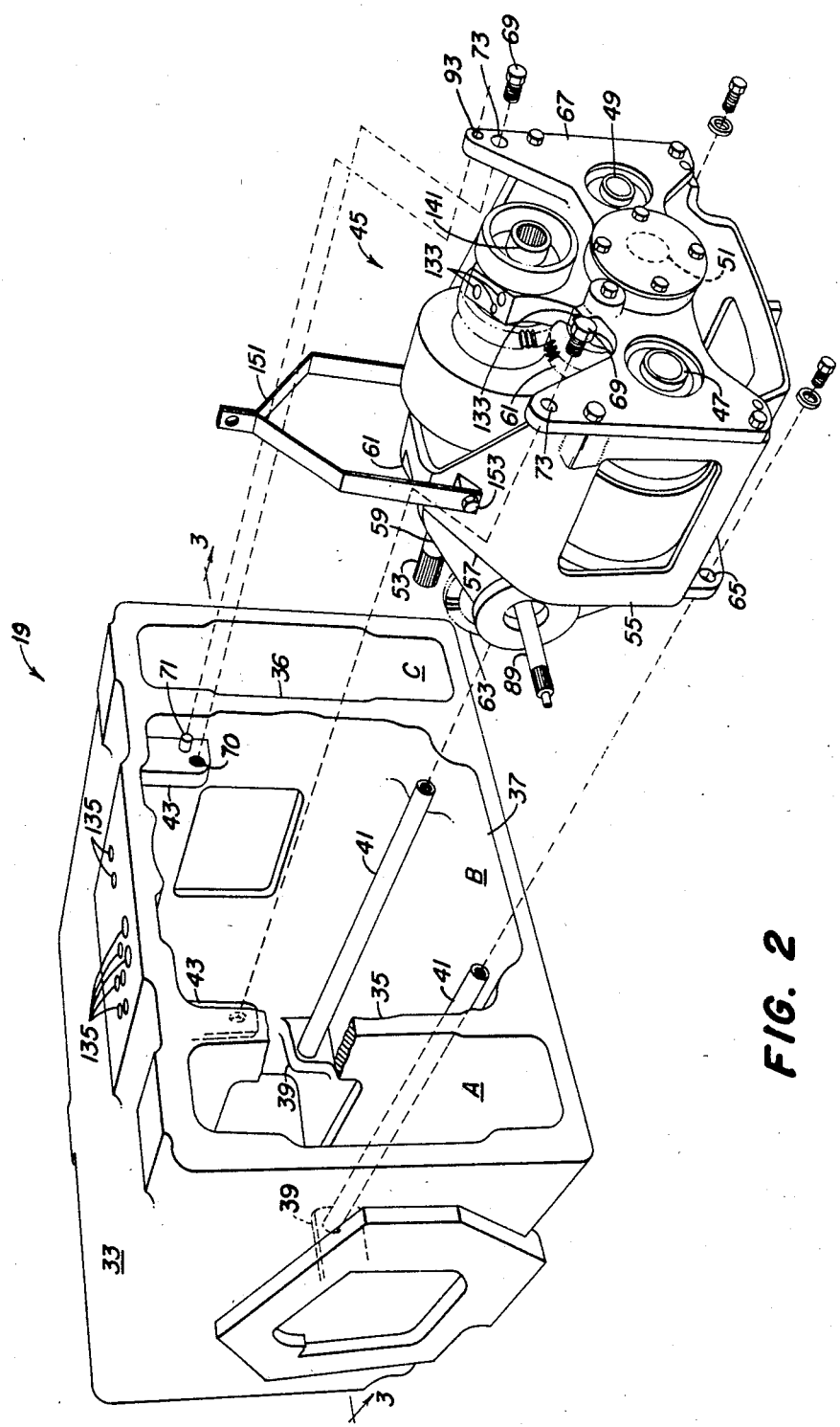
FIG. 2 is an exploded view of the rear frame section and accompanying transmission.

Referring to FIG. 2, the rear frame portion 19 is comprised of a housing 33 having an open rear face. A first and second interior wall 35 and 36, respectively, are formed in housing 33 in spaced apart alignment to divide the interior of housing 33 into transversely aligned sections A, B, and C. Formed generally forwardly in the middle section B to the bottom wall 37 of the housing 33 are first and second mounting members 39. Guide rods 41 are fixably mounted by any conventional means to a respective mounting member 39 to extend rearwardly in a cantilevered manner. Rearwardly located in section B is a plurality of formed mounting walls 43.

A transmission, generally indicated as 45, is mounted in the housing section B in a manner subsequently described. The preferred embodiment of transmission 45 is characterized by its generally low profile. To achieve a low profile, transmission 45 includes a plurality of shafts 47, 49, and 51 aligned parallel, and coplaner along the horizontal, the output shaft 51 being placed between gear shafts 47 and 49. An input shaft 53 is aligned generally directly above and extends parallel with the output shaft 51. The shafts 47, 49, 51 and 53 are rotatably mounted in a transmission frame or casing 55 between casing wall 57 and 67 by any conventional means.

The transmission casing's forward wall 57 has a pair of outwardly extending formed mounting arms 59 and 61. The arms 59 and 61 have transversely aligned holes for mounting of a ring gear assembly 63 to be described subsequently.

The forward wall 57 of the transmission casing 55 has a bottom portion extending downwardly containing a plurality of spaced apart apertures 65 therein (only one shown). A rear wall 67 of the casing 55 has a vertical upwardly extending portion containing a plurality of spaced apart apertures 73. The transmission 45 is slidably mounted on guide rails 41 which extend through respective apertures 65. The vertically extending portion of casing wall 67 is detachably mounted by any conventional means to mounting walls 43 such as by bolts 69 received in threaded hole 70. For the purpose of alignment, one of the mounting walls 43 has a formed outwardly extending guide pin 71 which is matingly received by a guide aperture 93 in the rear wall 67 of the transmission. To further assure proper alignment, guide rods 41 have an increasing stepped diameter to assure a mating fit in apertures 65 when the guide pin 71 is fully received in aperture 93.

Figure 3:
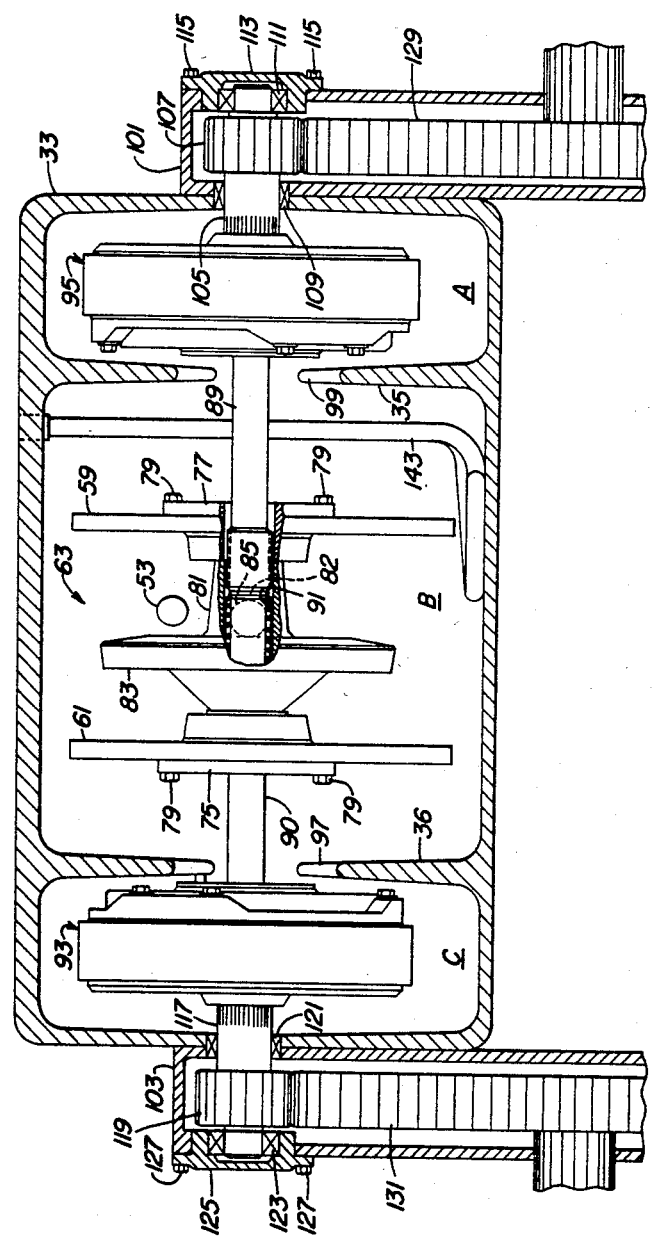
FIG. 3 is a partial sectional end view of the transmission within the rear housing of the vehicle frame along line 3—3.

Referring more particularly to FIG. 3, the ring gear assembly 63 includes first and second quills 75 and 77, respectively, fixably mounted in the hole of respective mounting arms 61 and 59 by any conventional means, such as by bolts 79. A ring gear hub 81 carrying a ring gear 83 is rotatably suspended between quills 75 and 77 in a conventional manner on respective bearings within the quills 75 and 77. The bevel pinion 85 is in constant mesh with the ring gear 83 and is fixably mounted to the output shaft 51 of transmission 45 by any conventional means. As part of a steering drive mechanism, steering shafts 89 and 90 extend into the hub 81 from a respective side to assume an end abutting colinear alignment at 82. Each shaft 89 and 90 is in splined engagement with hub 81 at 91. The other end of the steering shaft 90 is received by a first conventional brake-clutch 93 in a conventional manner located in housing section C. The other end of the steering shaft 89 is received by a second conventional brake-clutch 95 in a conventional manner located in housing section A. The respective end portions of steering shafts 89 and 90 extend through openings 99 and 97 in respective walls 35 and 36.

Fixably mounted to each side of housing 33 is a final drive gear housing 101 or 103. A shaft 105 in driven communication with clutch-brake 95 in a conventional manner extends from clutch-brake 95 into housing 101. The shaft 105 has fixably mounted thereon a gear 107 located in housing 101. The shaft 105 is rotatably mounted in housing 101 by any conventional means such as by bearings 109 and 121. A quill 113 housing bearing 111 is detachably mounted to the housing 101 by any conventional means such as by bolts 115, such that removal of the quill 113 permits removal of shaft 105 and gear 107.

In like manner to shaft 105, a shaft 117 is in driven communication with clutch-brake 93 in a conventional manner and extends into housing 103. The shaft 117 is rotatably mounted in housing 103 on bearings 121 and 123. A quill 125 housing bearing 123 is detachably mounted to the housing 103 by bolts 127 to permit removal of shaft 117 and gear 119. Gears 107 and 119 are in driving communication with respective final drive gears 129 and 131 rotatably mounted by any conventional means in respective housings 101 and 103 to communicate with the vehicle's drive sprockets 25 in a conventional manner.

Figure 4:
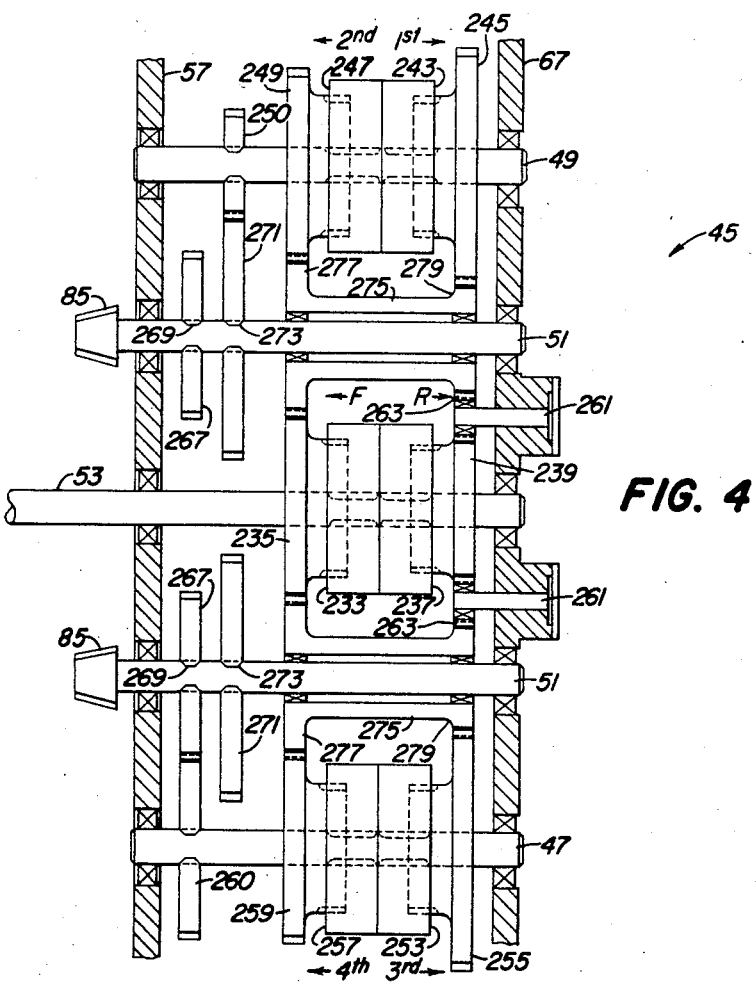
FIG. 4 is a schematic of the transmission with the present invention.

Referring now to FIG. 4, a low profile transmission 45 particularly suited is shown in schematic with some components out of true position for the purpose of clarity. The transmission 45 is a power shift with four forward and four reverse speeds. The input shaft 53 is rotatably mounted by any conventional means to the forward and rearward walls 57 and 67, respectively. A conventional power shift forward clutch assembly 233 is mounted in a conventional manner to shaft 53 clutchable to a gear 235 rotatably mounted on shaft 53 in a conventional manner for coupling gear 235 to the input shaft 53, and a conventional power shift reverse clutch assembly 247 is mounted in a conventional manner to shaft 53 clutchable to a gear 239 to the input shaft 53. The gear shaft 49 includes a first conventional power shift gear clutch assembly 243 mounted to shaft 49 in a conventional manner clutchable to a gear 245 rotatably mounted on shaft 49 to couple gear 245 to shaft 49. In like manner, shaft 49 also contains a second conventional power shift gear clutch assembly 237 clutchable in a conventional manner to a gear 249 to couple gear 249 to shaft 49. A gear 250 is fixably mounted by any conventional means to the first shaft 49. A third conventional gear clutch assembly 253 is mounted in a conventional manner to shaft 47 in a conventional manner to couple gear 255 to shaft 47. In like manner, a fourth conventional gear clutch assembly 257 is mounted to shaft 47 clutchable to a rotatably mounted gear 259 to couple gear 259 to shaft 47. Second gear shaft 47 also contains a gear 260 fixably mounted thereto by any conventional means. Fixably mounted in the housing to the rear wall 67 by any conventional means is an idler shaft 261, shown in two locations for the purpose of clarity. The idler shaft 261 carries a single gear 263 rotatably mounted thereon by any conventional means and in constant mesh with gear 239. The output shaft 51, shown in two locations for clarity, has fixably mounted thereon by any conventional means a first gear 267 at 269 in constant mesh with gear 260. A second gear 271 is fixably mounted by any conventional means to shaft 51 at 273 in constant mesh with gear 250. A double gear 275 is rotatably mounted by any conventional means to the output shaft 51, the double gear 275 including a first gear 277 in constant mesh with gears 249, 235 and 259 and a second gear 279 of double gear 275 including a first gear 277 in constant mesh with gears 245, 255 and 263. The output shaft 51 extends beyond the forward wall 57 of the housing 55 and has a bevel pinion 85 fixably mounted thereto by any conventional means. The following Table I shows the gearing action through the transmission under indicated conditions.

TABLE I

| Speed Range | | | Forward | | | |
|---|---|---|---|---|---|---|
| 1st | 235/277 | 277–279 | 279/245 | 245–250 | 250/271 | |
| 2nd | 235/277 | 277/249 | — | 249–250 | 250/271 | |
| 3rd | 235/277 | 277/279 | 279/255 | 255–260 | 260/267 | |
| 4th | 235/277 | 277/259 | — | 259–260 | 260/267 | |
| | | | Reverse | | | |
| 1st | 239/263 | 263/279 | — | 279/245 | 245–250 | 250/271 |
| 2nd | 239/263 | 263/279 | 279–277 | 277/249 | 249/250 | 250/271 |
| 3rd | 239/263 | 263/279 | — | 279/255 | 255–260 | 260/267 |
| 4th | 239/263 | 263/279 | 279–277 | 277/259 | 259/260 | 260/267 |

It is noted that the transmission 45 configuration eliminates the need for countershafts which are generally employed in off-road vehicle transmissions.

Figure 5:
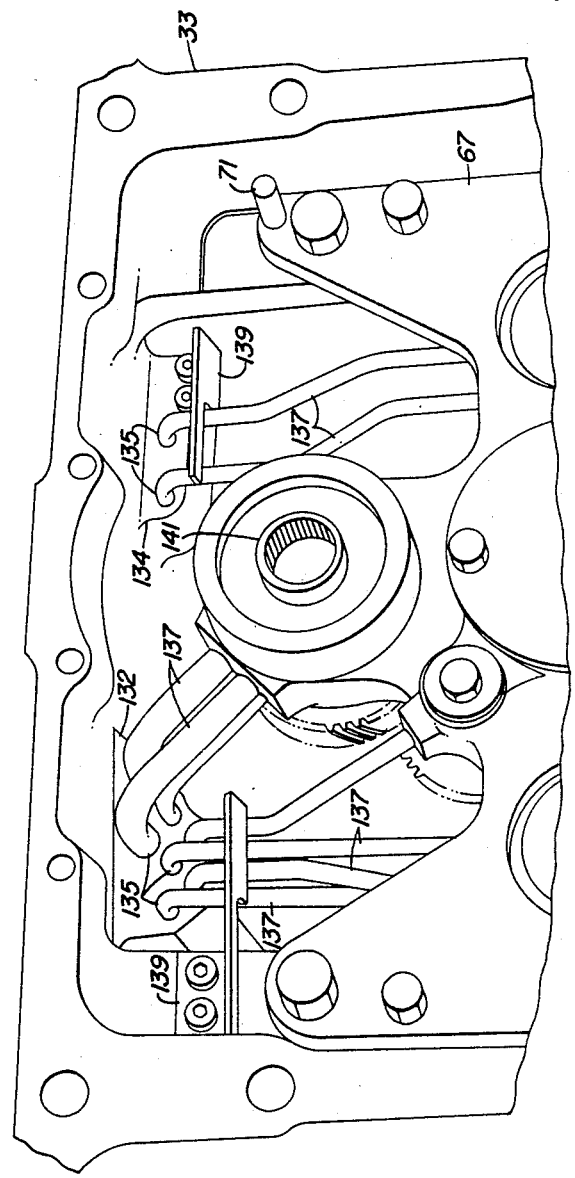
FIG. 5 is a partial end view of the transmission within the rear housing of the vehicle frame.

Referring to FIGS. 2 and 5, the transmission rear wall 67 contains a plurality of ports 133 (some not shown) for delivering hydraulic fluid to the transmission clutches for their selective operation and to the contained shafts for lubrication in a conventional manner. The top wall of housing 33 has a plurality of ports 135 therethrough leading to manifolds 132 and 134. A plurality of conduits 137 have one end received by a respective port 135 in mainfolds 132 or 134. The remaining end of each conduit 137 is received by a respective port 133. A retaining strip 139 is detachably mounted by any conventional means to manifold 134 to restrain motion of conduits 137. In like manner, a second retaining strip 139 is detachably mounted to wall 43 to restrain motion of conduits 137 associated with manifold 132. Any conventional means can be employed for selectively delivering fluid to ports 135.

A conventional power take-off coupler 141 is drivingly mounted to the input shaft 53 and rotatably mounted in wall 67 by any conventional means. Further, section B can function as a sump for vehicle's hydraulic system, whereby a return conduit 143 can retrieve fluid from section B (refer to FIG. 3) when an end wall (not shown) is detachably mounted to housing 33, enclosing section A, B, and C. The end wall will have an opening for access to the coupler 141. It is noted that the transmission casing 55 allows for spillage into housing section B, which may function as a means of returning hydraulic fluid to sump, i.e., section B.

To remove the transmission 45 from housing 33, the rear wall is removed. Quills 113 and 125 are removed to allow shafts 89, 90, 105 and 117 to be withdrawn from the housing 33. The retaining strips 139 can then be removed to allow conduits 137 to be withdrawn from ports 135. By removing bolts 69, the transmission can be slidably withdrawn from the housing along rods 41. To assist in handling the transmission 45, a transmission support mechanism 151 of conventional design can be attached to transmission 45 at 153 (one location not specifically shown).

The aforedescription is of the preferred embodiment, and should not be viewed as limiting. The full scope of the present invention is defined by the appended claims.

We claim:

1. A low profile transmission comprising: a casing having forward, rear and side walls, said rear wall containing a plurality of ports, an output shaft rotatably mounted in said forward and rear walls of said casing carrying a first and second gear fixably mounted to said output shaft, and a spiral pinion fixably mounted to the end of said output shaft extending forward of said forward wall communicating with said steering drive mechanism; a first gear shaft rotatably mounted in said forward and rear wall off said casing carrying a third gear fixably mounted to said first gear shaft in constant mesh with said first gear, a plurality of fourth gears rotatably mounted to said first gear shaft, first clutching means for selectively coupling one of said fourth gears to said first gear shaft; a second gear shaft rotatably mounted in said forward and rear wall of said casing carrying a fifth gear fixably mounted to said second gear shaft and in constant mesh with said second gear; a plurality of sixth gears rotatably mounted to said second gear shaft; second clutching means for selectively coupling one of sixth gears to said second gear shaft; said output shaft, first gear shaft, and second gear shaft extending generally parallel and coplanar to each other, an input shaft rotatably mounted in said forward and rear walls of said casing carrying a seventh and eighth gear rotatably mounted on said input shaft, means for selectively clutching said seventh and eighth gears to said input shaft; a countershaft having a ninth gear rotatably mounted thereon in constant mesh with said eighth gear, said countershaft being fixably mounted in said casing, said output shaft having a plurality of tenth gears carried on a hub rotatably mounted on said output shaft, each of said tenth gears being in mesh with a respective one of said fourth and sixth gears; one of said tenth gears in constant mesh with said seventh gear and another one of said tenth gears is in constant mesh with said ninth gear; means for communicating said ports with said clutching means.

* * * * *